United States Patent
Gailloux et al.

(10) Patent No.: US 8,462,677 B1
(45) Date of Patent: Jun. 11, 2013

(54) ENABLING COMMUNICATION BETWEEN END POINTS OF DIFFERENT NETWORKS

(75) Inventors: Mike Gailloux, Overland Park, KS (US); Devon Biere, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 865 days.

(21) Appl. No.: 11/466,558

(22) Filed: Aug. 23, 2006

(51) Int. Cl.
*H04B 7/00* (2006.01)

(52) U.S. Cl.
USPC .......... 370/310; 370/349; 370/392; 370/466; 455/412.1; 455/414.1; 455/414.4; 455/466; 455/41.2; 455/410; 455/3.01; 455/422.1

(58) Field of Classification Search
None
See application file for complete search history.

(56) References Cited

U.S. PATENT DOCUMENTS

| | | | |
|---|---|---|---|
| 5,038,211 | A | 8/1991 | Hallenbeck |
| 6,553,222 | B1 | 4/2003 | Weiss |
| 6,795,702 | B2 | 9/2004 | Sennett |
| 7,006,881 | B1 * | 2/2006 | Hoffberg et al. ............ 700/83 |
| 7,483,964 | B1 * | 1/2009 | Jackson et al. ............. 709/221 |
| 7,627,341 | B2 | 12/2009 | Wu |
| 7,831,243 | B2 * | 11/2010 | Thomas ................ 455/414.1 |
| 2003/0073411 | A1 * | 4/2003 | Meade, II ................ 455/70 |
| 2006/0126556 | A1 * | 6/2006 | Jiang et al. .............. 370/328 |
| 2006/0194535 | A1 * | 8/2006 | Houldsworth et al. ...... 455/3.01 |
| 2007/0135087 | A1 * | 6/2007 | Villevieille et al. ......... 455/403 |
| 2008/0009268 | A1 | 1/2008 | Ramer et al. |
| 2008/0153413 | A1 * | 6/2008 | Li et al. ................. 455/3.01 |

OTHER PUBLICATIONS

Advisory Action mailed Dec. 1, 2009 in U.S. Appl. No. 11/466,643.
Final Office Action mailed Sep. 1, 2009 in U.S. Appl. No. 11/466,643.
Non-Final Office Action mailed Feb. 20, 2009 in U.S. Appl. No. 11/466,643.
Non-Final Office Action mailed Feb. 2, 2010 in U.S. Appl. No. 11/466,643.
Non-Final Office Action mailed Aug. 3, 2010 in U.S. Appl. No. 11/466,643.
Final Office Action mailed Jan. 21, 2011 in U.S. Appl. No. 11/466,643.

* cited by examiner

*Primary Examiner* — Willie J Daniel, Jr.

(57) ABSTRACT

Systems and methods are provided for enabling a first end point associated with a first network to communicate with a second end point associated with a second network. In one embodiment, a request to initiate communication from the second end point is received at a short-range wireless device associated with the first end point. The first end point communicates with the second end point through the short-range wireless device to receive a message from the second end point at the short-range wireless device. The message is translated at the short-range wireless device for the first end point.

10 Claims, 3 Drawing Sheets

ENABLING COMMUNICATION BETWEEN END POINTS OF DIFFERENT NETWORKS

CROSS-REFERENCE TO RELATED APPLICATIONS

This application is related by subject matter to the Application entitled "PERSONALIZED TELEVISION" having Ser. No. 11/466,643, filed on even date herewith, and which is incorporated by reference herein.

STATEMENT REGARDING FEDERALLY SPONSORED RESEARCH OR DEVELOPMENT

Not Applicable.

BACKGROUND

Historically, networks offering unrelated services such as a media-delivery network (e.g., cable-television network) and a communications network (e.g., mobile telecommunications network) have not shared customer profiles containing information that includes interests and preferences of individual customers. Technologies developed in recent years, however, have brought such networks closer. The current state of the art could be improved by providing, among other things, the networks with ability to share mutually collected user information such as purchasing history or preferences of individual customers.

SUMMARY

The present invention is defined by the claims below, not this summary. Embodiments of the present invention provide a system, method, and product for, among other things, facilitating direct communication between mobile devices associated with a wireless communications carrier and a media host device associated with a media-content provider. The present invention has several practical applications in the technical arts, including allowing vendors to more accurately target advertising to specific customers and allowing customers the benefit of indicating their respective preferences.

In a first aspect, an exemplary embodiment of the present invention relates to a method for enabling a media host device associated with a media-delivery network to communicate with a mobile end point associated with a wireless communications network. A request to initiate communication from the mobile end point is received. The media host device communicates with the mobile end point through a short-range wireless device to receive a message in a first format. The message in the first format is converted to a second format. The message is communicated to the media-delivery network.

In another aspect, an exemplary embodiment of the present invention relates to a method for enabling a first end point associated with a first network to communicate with a second end point associated with a second network. A request to initiate communication from the second end point is received at a short-range wireless device associated with the first end point. The first end point communicates with the second end point through the short-range wireless device to receive a message from the second end point at the short-range wireless device. The message is translated at the short-range wireless device for the first end point.

In yet another aspect, an exemplary embodiment of the invention takes the form of a system for enabling a first end point associated with a first network to communicate with at least one second end point associated with a second network. The system includes a short-range wireless interface module and a translator module. The short-range wireless interface module is associated with the first end point and configured to communicate directly with the at least one second end point. The translator module is configured to translate a message received at the short-range wireless interface module from the at least one second end point for the first end point so that the message can be communicated to the first end point.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
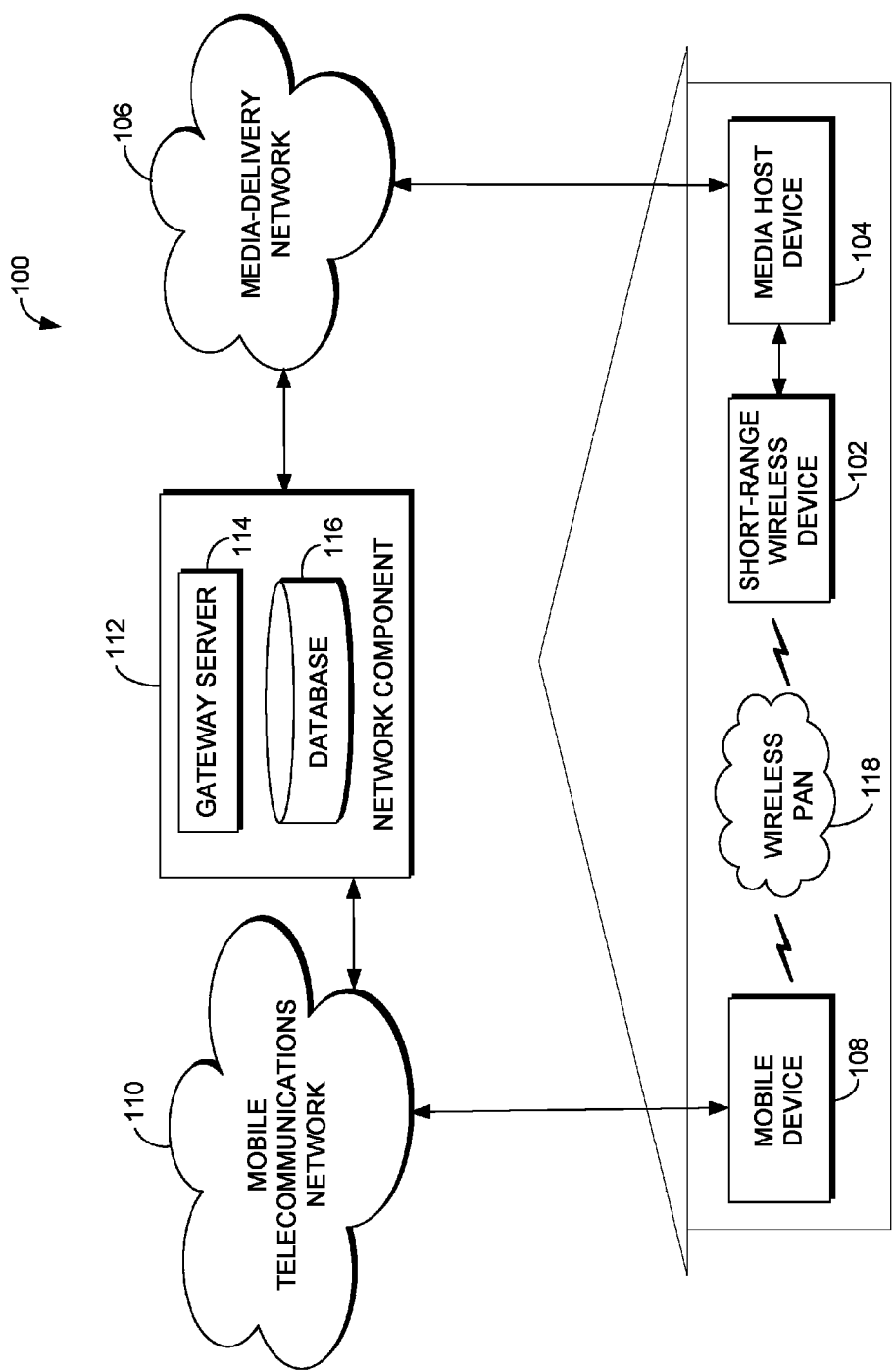
FIG. 1 depicts an exemplary system environment suitable for use in implementing embodiments of the present invention.

Embodiments of the present invention provide systems and methods for enabling an end device associated with a network such as a media-delivery network, and more particularly a cable-television network, to directly communicate with an end device associated with a different network such as a communications network, and more particularly a mobile telecommunications network, thereby facilitating to share user information that is collected through user interactions with each of the networks.

While the type of communications network described in detail herein is a mobile telecommunications network, one skilled in the art will appreciate that the present invention may be implemented with other types of communications networks permitting the multidirectional exchange of information (in any format, including analogue). Likewise, one skilled in the art will appreciate that while a cable-television network is described herein as an example of a media-delivery network, the present invention may be implemented with other types of media-delivery networks.

Both the communications network and the media-delivery network may be protected, private networks wherein two entities must cooperatively integrate separate networks to provide services. Components within the networks and communication pathways within and between the networks may also be protected. There is, however, no reason that the present invention could not be implemented in a wholly owned scenario wherein both the communications network and the media-delivery network belong to the same entity.

I. ACRONYMS AND SHORTHAND NOTATIONS

Throughout the description of the present invention, several acronyms and shorthand notations are used to aid the understanding of certain concepts pertaining to the associated systems and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third Generation |
| A-Key | Authentication Key |
| AMPS | Advanced Mobile Phone System |
| BTS | Base Transceiver Station |
| CDMA | Code Division Multiple Access |
| CD-ROM | Compact Disc-Read Only Memory |
| DAVIC | Digital Audio Video Council |
| DOCSIS | Data Over Cable Service Interface Specification |
| DVD | Digital Versatile Disc |
| DVR | Digital Video Recorder |
| EEPROM | Electrically Erasable Programmable Read Only Memory |
| ESN | Electronic Serial Number |
| GSM | Global System for Mobile Communications |
| HBO | Home Box Office |
| HDR | Hard Disk Recorder |
| HFC | Hybrid Fiber Coaxial |
| IEEE | Institute of Electrical and Electronics Engineers |
| IP | Internet protocol |
| MAC | Media Access Control |
| MIN | Mobile Identification Number |
| OCAP | Open Cable Application Platform |
| PAN | Personal Area Network |
| PDA | Personal Data Assistant |
| PDSN | Packet Data Serving Node |
| PTR | Personal TV Receiver |
| PVR | Personal Video Recorder |
| PVS | Personal Video Station |
| RAM | Random Access Memory |
| ROM | Read Only Memory |
| RF | Radio Frequency |
| STB | Set-Top Box |
| TDMA | Time Division Multiple Access |
| USB | Universal Serial Bus |
| VPN | Virtual Private Network |

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a computer, and various other network devices. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

The subject matter of the present invention is described with specificity herein to meet statutory requirements. However, the description itself is not intended to limit the scope of this patent. Rather, the inventors have contemplated that the claimed subject matter might also be embodied in other ways, to include steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed.

II. EXEMPLARY SYSTEM ENVIRONMENT

Turning now to FIG. 1, an exemplary system environment suitable for use in implementing embodiments of the present invention is provided and referenced generally by the numeral 100. FIG. 1 is illustrative in nature and should not be construed as limiting the present invention, as with all of the figures herein. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components and in any suitable combination and location. Various functions described herein as being performed by one or more entities may be carried out by hardware, firmware, and/or software. For instance, various functions may be carried out by a processor executing instructions stored in memory.

As shown in FIG. 1, system environment 100 may include, among other components, a short-range wireless device 102, a media host device 104, a media-delivery network 106, a mobile device 108, a mobile telecommunications network 110, a network component 112, a gateway server 114, a database 116, and a wireless personal area network (PAN) 118. As indicated previously, although a mobile telecommunications network is described in detail herein, other types of communications networks may be employed within the scope of the invention. Likewise, although a cable-television network is described in detail herein, other types of media-delivery networks may be employed within the scope of the invention.

1. The Short-Range Wireless Device

In general, the short-range wireless device 102 enables the media host device 104 to communicate directly with the mobile device 108. Typically, the short-range wireless device 102 communicates via the wireless PAN 118 with the mobile device 108. In some embodiments, the short-range wireless device 102 is integrated into the media host device 104. In alternative embodiments, the short-range wireless device 102 is separate from the media host device 104. This can take the form of the short-range wireless device 102 being coupled to the media host device 104 via a cable such as a universal serial bus (USB) cable. Other potential connections include a serial connection, parallel connection, and IEEE 1349 firewire connection, and the like. In such embodiments, the short-range wireless device 102 may be what is referred to in the art as a "Bluetooth" device.

A Bluetooth device is any device that can communicate using the Bluetooth protocol and variations thereof. The Bluetooth protocol, as with all protocols, will go through several variations. One version is currently described in the IEEE 802.15 standard, which is incorporated herein by reference to more particularly describe what is meant by "the Bluetooth protocol." Typically, later-developed devices are backwards compatible; thus, the current invention contemplates devices that will be invented in the future that can communicate over at least a variation of a Bluetooth protocol or equivalent thereof.

In general, the short-range wireless device 102 can simultaneously handle requests and messages from two or more of the mobile device 108. For example, the short-range wireless device 102 can handle a request to initiate communication from a mobile device while receiving, translating, and processing multiple messages from two or more of the mobile device 108 through the wireless PAN 118. The short-range wireless device 102 can also simultaneously detect, initiate communications with, and send messages to two or more of the mobile device 108.

2. Media Host Device

In general, the media host device 104 may be any device arranged to receive and display analog and/or digital television content and which is capable of communicating data to the media-delivery network 106. By way of example and not limitation, the media host device 104 may be a set-top box (STB), a legacy box, an STB having an integrated cable modem, a digital video recorder (DVR), a personal video recorder (PVR), a hard disk recorder (HDR), a personal video station (PVS), a personal TV receiver (PTR) and/or an integrated terminal device, physically integral to, for example, a television.

A display device (not shown) and a control component (not shown) may be communicatively connected to the media host device 104. The display device may be any type of device capable of displaying television content and other data from the media host device 104. For example, the display device may be a television or monitor. The control component may be an infrared remote control device sensed by the media host device 104. Other devices, such as mobile telephones, keyboards, or PDAs could provide the same functionality. The connection between the control component and the media host device 104 may be wireless, such as an infrared, radio, 802.11x, or Bluetooth connection, or directly by a cable or other physical connection such as a Universal Serial Bus (USB) connector.

The media host device 104 may have a MAC (Media Access Control) address, which will typically be assigned to the device by the manufacturer and will identify the media host device 104 as a unique physical device. In operation, each time the media host device 104 is powered on, it may transmit to the media-delivery network 106, via an out-of-band signaling channel, a registration/authentication message, which may contain the MAC address, as well as any other data uniquely identifying and authenticating the media host device 104 to the media-delivery network 106. For example, the majority of cable providers use proprietary methods of registration and authentication specific to their particular head end implementation(s) and media host device manufacturer(s); however, some standards are evolving, such as OCAP (Open Cable Application Platform). Once the media host device 104 has registered and authenticated, the media-delivery network 106 may assign the media host device 104 a network address to use until the next time the media host device 104 is booted up. It is to this network address that any data bound for the media host device 104 may be transmitted.

The media-delivery network 106 may then associate the media host device's 104 MAC address or another identifier with the assigned network address of the media host device 104. Through this association, the customer's account then has a unique identifier associated with a unique network address on the media-delivery network 106. Typically, this network address will be an IP address. For example, the cable-television service provider will use IP routing to transmit cable-television content and other data to the media host device 104. However, proprietary addressing schemes, such as a VPN (Virtual Private Network) may be used as well.

3. Media-Delivery Network

Typically, entities on the media-delivery network 106 are able to communicate with the media host device 104 via a head end (not shown). Television content and other data may be transmitted from the head end to the media host device 104 using any suitable media, such as any combination of fiber-optic and coaxial cable, making up a HFC network (not shown). The HFC network may contain a number of fiber nodes (not shown), which enable the transition between the fiber-optic and coaxial-cable portions of the network. Any number of fiber nodes may be used to convert from (i) fiber signals (carried by fiber-optic cable from the head end to the fiber nodes) to (ii) RF signals (carried by coaxial cable from the fiber nodes to the media host device 104).

The head end may be connected to multiple types of sources of television, media, and/or data content. The head end may operate to amplify and modulate the video, audio, and data content onto a number of channels, so that the content of these sources may be received by devices, such as the media host device 104. The head end may also operate to transmit and receive packet data to and from devices, such as the media host device 104, via the HFC network. The packet-data signaling between the head end and the media host device 104 via the HFC network may employ an "out-of-band" signaling channel and may comply with specifications, such as "DAVIC" (Digital Audio Video Council) specifications or "DOCSIS" (Data Over Cable Service Interface Specification). Communications, such as providing program guide information, performing software updates, fault monitoring, configuration, programming, accounting, and performance monitoring may be conducted on the out-of-band signaling channel. The out-of-band signaling channel may also be used by the media host device 104 to transmit information to the media-delivery network 106, such as registration and authentication messages, requests for program guide information, pay-per-view ordering messages, and a message confirming receipt and/or processing of an external command/request received through the head end.

4. Mobile Device

The mobile device 108 may be any type of device capable of wireless communication. By way of example and not limitation, the mobile device 108 can take the form of a mobile phone, personal data assistant (PDA), Blackberry® type device, or the like. Any device capable of communicating via a common protocol through the wireless PAN 118 to the media host device 104 is contemplated within the scope of the present invention.

The mobile device 108 may be identified by employing any of a number of identifiers. By way of example and not limitation, the mobile device 108 may be identified using a unique Electronic Serial Number (ESN), which is typically hard-coded into the device; a unique Mobile Identification Number (MIN), which is typically assigned to the device by a telecommunications-service provider; a special authentication key (A-Key), which may be used for validating the mobile device's 108 identity; and/or a predetermined username and password. In addition, the mobile device 108 may be capable of engaging in packet-data communication and may be identified by a network address, such as an IP address. The network address may be permanently assigned to the mobile device 108 or may be dynamically assigned using a number of methods, such as a Simple IP process or a Mobile IP process.

5. Mobile Communication Network

To provide wireless service to the mobile device 108, the mobile communications network 110 may include a base transceiver station (BTS) (not shown), which provides a wireless coverage area. The BTS may communicate over a wireless air interface with one or more mobile devices, such as the mobile device 108, located in the wireless coverage area. The communication between the BTS and the mobile device 108 may occur in a digital format, such as CDMA, TDMA, GSM, 3G, or 802.11x, or may occur in an analog format, such as AMPS.

The BTS may be coupled with a base station controller (BSC) (not shown) that may include a packet control function, and a packet data serving node (PDSN) (not shown) may connect the BSC to the mobile communications network 110. The PDSN may then act as a network access server, providing wireless service to the mobile device 108. Alternatively or additionally, the mobile communications network 110 may include other network elements for providing wireless service to the mobile device 108.

6. Network Component

Typically, the network component 112 contains the gateway server 114 and the database 116. The network component 112 may be on either network. In some embodiments, the network component 112 is on the media-delivery network 106. In such embodiments, the network component 112 typically resides in a head end on the media-delivery network 106. Alternatively, the network component 112 may be communicatively coupled to the head end. In such embodiments, entities on the mobile communications network 110 can access the database 116 through the gateway server 114. In some other embodiments, the network component 112 is on the mobile telecommunications network 106. In such embodiments, the network component 112 typically resides in a communication server. In such embodiments, entities on the media-delivery network 110 can access the database 116 through the head end and the gateway server 114. In yet some other embodiments, either only the gateway server 114 or the database 116 resides in the network component 112. In such embodiments, the gateway server 114 and the database 116 may not reside on the same network.

7. Gateway Server

Typically, the gateway server 114 resides within the network component 112 and is able to communicate with entities on both the media-delivery network 106 (e.g., the media host device 104) and the mobile telecommunications network 110 (e.g., the mobile device 108), thereby allowing communication between entities on the two networks. However, in the case where the mobile telecommunications and media-delivery networks are under the control of one entity, the use of the gateway server 114 to bridge between the two networks may not be required.

8. Database

The database 116 stores portions of data that are desired to be shared between the mobile telecommunications network 110 and the media-delivery network 106. Authenticated entities on the two networks share access to the database 116. In some embodiments, the database 116 includes any collection of records including a single table. In such embodiments, the shared data may take the form of a table of data. In some embodiments, the shared data includes subscriber profile data such as a subscriber's address, hobbies or interests, an income level, media preferences including programming preferences, a political indication, a religious indication, an age indication, familial data, and subscriber-generated preferences, which would allow the subscriber to define his or her own category and then populate the category.

9. Wireless Personal Area Network

In general, a personal area network (PAN) is a computer network that is used for facilitating communication among computing devices (e.g., the mobile device 108 and the media host device 104) that are within certain proximity of each other. Typically, the wireless PAN 118 is a network that communicates data within ranges on the order of feet or tens of feet. In some embodiments, the range can be greater than tens of feet, but for purposes of explanation herein, it will be assumed that the range is on the order of tens of feet.

III. AN EXEMPLARY METHOD FOR INITIATING COMMUNICATION BETWEEN END POINT DEVICES

Figure 2:
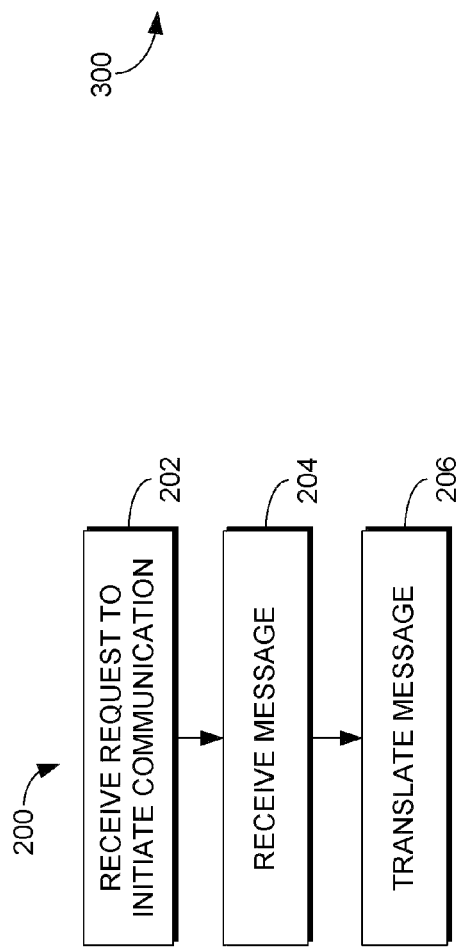
FIG. 2 depicts an exemplary method for initiating direct communication between a mobile device associated with a mobile telecommunications network and a media host device associated with a media-delivery network using a short-range wireless device in accordance with an embodiment of the present invention.

FIG. 2 is a block diagram showing an exemplary method 200 for initiating direct communication between a mobile device associated with a mobile telecommunications network and a media host device associated with a media-delivery network using a short-range wireless device. At block 202, the short-range wireless device 102 receives a request to initiate communication from the mobile device 108 through the wireless PAN 118. Typically, the short-range wireless device 102 is associated with the media host device 104. In some embodiments, the short-range wireless device 102 is communicatively connected to the media host device 104. Alternatively, in some other embodiments, the short-range wireless device 102 is integrated into the media host device 104.

At block 204, a message from the mobile device 108 is received at the short-range wireless device 102 after the request to initiate communication is acknowledged. In some embodiments, the short-range wireless device 102 uses the Bluetooth protocol to communicate with the mobile device 108. At block 206, the short-range wireless device 102 translates the message for the media host device 104. In some embodiments, the media-delivery network 106 and the mobile telecommunications network 110 are protected, private networks. In such embodiments, typically the message is encrypted. In general, the short-range wireless device 102 performs decryption of encrypted messages. For instance, the short-range wireless device 102 may run a proprietary software that can decode the message. In some embodiments, the two networks may use different formats. In such embodiments, the short-range wireless device 102 typically converts the message to a format native to the media-delivery network 106.

For example, suppose that a user came home early to watch a sports event (e.g., a football game) and found his wife watching her favorite cooking channel. The user really wants to watch the event, but he does not wish to disturb his wife. The user picks up his mobile phone, which has been already registered for direct communication with the cable set-top box in his living room, and sends a request to initiate communication with the short-range wireless device 102 that is connected to the cable set-top box. The short-range wireless device 102 receives the request and sends back an acknowledgement that it is ready to communicate. The user sends a message containing information related to the sports event (e.g., the channel that would broadcast the event and the start time) and a request that the sports event be sent to his mobile phone when it starts. The short-range wireless device 102 receives the message and translates it to a format that is native to the cable set-top box and the cable-television network associated therewith.

IV. AN EXEMPLARY METHOD FOR DIRECT COMMUNICATION BETWEEN END POINT DEVICES

Figure 3:
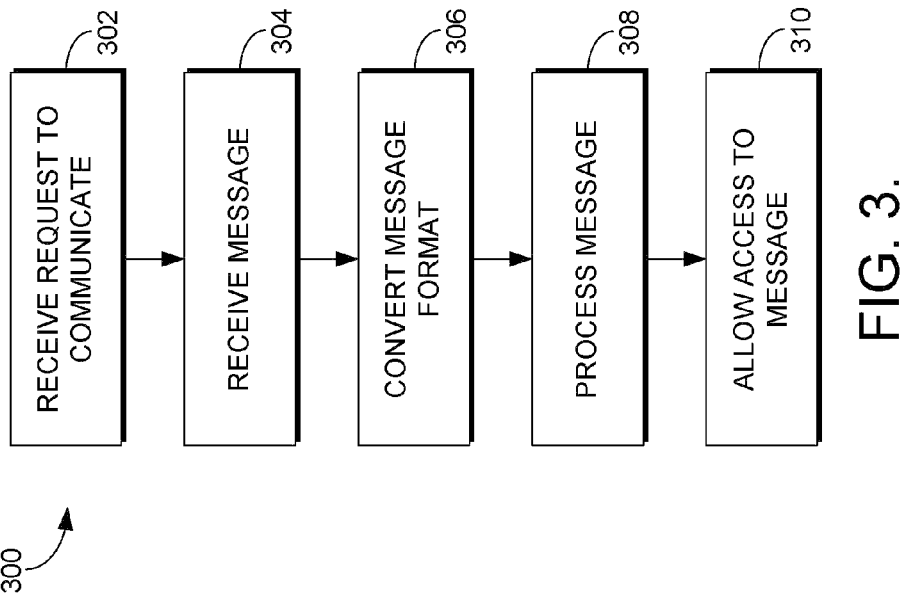
FIG. 3 depicts an exemplary method for enabling direct communication between a mobile device associated with a mobile telecommunications network and a media host device associated with a media-delivery network using a short-range wireless device in accordance with an embodiment of the present invention.

FIG. 3 is a block diagram showing an exemplary method 300 for enabling direct communication between a mobile device associated with a mobile telecommunications network and a media host device associated with a media-delivery network using a short-range wireless device. At block 302, the short-range wireless device 102 associated with the media host device 104 such as a cable set-top box receives a request to initiate communication from the mobile device 108 through the wireless PAN 118.

At 304, the short-range wireless device 102 receives a message from the mobile device 108 once it acknowledges the request. In some embodiments, the short-range wireless device 102 authenticates the mobile device 102 using identification information contained in the request. Typically, the identification information includes a unique electronic serial number (ESN), a unique mobile identification number (MIN), a special authentication key (A-Key), and/or a predetermined username and password.

At block 306, the short-range wireless device 102 converts the message format for use by the media host device 104. In some embodiments, the short-range wireless device 102 extracts the text of the information contained in the message and repackages the text into a format native to the media host device 104 and the media-delivery network 106. At block 308, the media host device 104 receives and processes the message. Typically, the message contains one or more specific requests that require performing a task or scheduling a task to be performed in near future. Some of the requests can be honored by the media host device 104. For instance, a subscriber's request to record a particular television show can be processed by the media host device 104 by scheduling a recording task. Some of the requests, however, may require other entities on the media-delivery network 106 to be involved.

At block 310, the content of the message is made available for access from any authorized entities on the mobile telecommunications network 110. In some embodiments, a notification message is sent to the mobile telecommunications network 110 from the media-delivery network 106 through a head end and the gateway server 114. In some other embodiments, a dedicated entity on the mobile telecommunications network 110 polls to determine whether a message is available for processing.

Returning to the example of a user and his wife, once the user's message is translated for the cable set-top box and the associated cable-television network, the cable set-top box communicates the request to a head end on the cable-television network through an HFC network. The head end then processes the request by notifying the communications network associated with the user's mobile phone and by placing a media identifier which designates the media variety, run times and the point in the media from which to start and stop in an application which can be accessed by the wireless terminal. The communications network then retrieves the media identifier from the database 116 and moves it to the user's mobile phone where the mobile phone can provide the sports event to the user.

V. AN EXEMPLARY METHOD FOR DETECTING AN END POINT DEVICE

Figure 4:
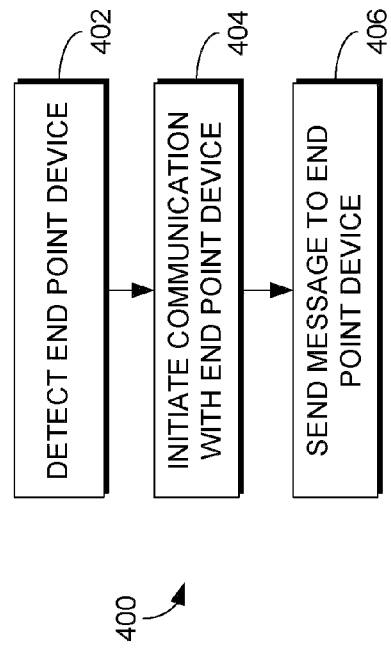
FIG. 4 depicts an exemplary method for detecting a mobile device associated with a mobile telecommunications network using a short-range wireless device in accordance with an embodiment of the present invention.

FIG. 4 is a block diagram showing an exemplary method 400 for detecting a mobile device associated with a mobile telecommunications network using a short-range wireless device. At block 402, the short-range wireless device 102 detects the presence of the mobile device 108 when the mobile device 108 enters within range of the wireless PAN 118. For instance, the short-range wireless device 102 associated with a cable set-top box would detect the presence of a person's mobile phone when the person walks into her house carrying her mobile phone, provided that her mobile phone has been registered for direct communication with the cable set-top box. In some embodiments, the short-range wireless device 102 detects the mobile device 108, learns the unique identification number of the mobile device 108, and authenticates the mobile device 108 based on the identification number.

At block 404, the short-range wireless device 102 initiates communication with the mobile device 108. In some embodiments, the short-range wireless device 102 sends a request containing identification information. The mobile device 108 authenticates the request upon receipt thereof and sends back an acknowledgement. Once the initial handshaking between the short-range wireless device 102 and the mobile device 108 is complete, the short-range wireless device 102 begins communicating with the mobile device 108 by sending messages at block 406.

Returning to the example of a user and his wife, assume that a profile is maintained for the user and his wife, respectively, in the database 116. When they walk into their house after a weekly grocery shopping trip, the short-range wireless device 102 connected to the cable set-top box mounted on the television detects their mobile phones. The television is off but a new episode of the user's favorite HBO miniseries (e.g., Band of Brothers) will air in 10 minutes. The user, however, has forgotten all about the new episode. In addition, a kitchenware marketing demonstration is showing on his wife's favorite cooking channel. After detecting the presence of the couple's mobile phones, the short-range wireless device 102 retrieves a profile associated with each of them and learns that the user has not missed a single episode of the miniseries during the past four seasons and the wife enjoys cooking and kitchenware demonstration shows.

The short-range wireless device 102 then simultaneously initiates communication with the couple's mobile phones by sending a request to each mobile phone. The user's mobile phone authenticates the request and sends back an acknowledgement in one embodiment. The wife's mobile phone responds similarly. The short-range wireless device 102 then sends two messages containing information about the new episode and the kitchenware demonstration to the couple's mobile phones, respectively. The user reads the message on his mobile phone and realizes that he is about to miss the new episode. The user's wife also reads the message on her mobile phone and realizes that the demonstration is something that she has been hoping to run into for a long time.

When the user hurries to the television to watch the episode, his wife tells him of the kitchenware demonstration and the opportunity to possibly purchase some of the kitchenware products. The user yields the channel to his wife and sends a message to the cable set-top box from his mobile phone through the short-range wireless device 102, requesting to record the new episode. In the meantime while watching the demonstration, his wife is placing purchase orders for some of the products used in the demonstration through the Internet using her mobile phone.

The cable set-top box (or similar circuitry, which may even be embedded in a display unit such as a television) updates the user's profile such that in the future, in the event the user forgets to request such a recording, it may automatically record a new episode based on the updated profile. The communications network associated with the couple's mobile phones also updates the wife's profile using her Internet purchasing records such that it can be used by the cable set-top box in the future to alert her of other related cooking shows and product demonstrations.

Advantageously, the present invention enables the media-delivery network 106 and the mobile telecommunications network 110 to share information about individual users who maintain an account with each of the two networks. As in the example above, for instance, the user and his wife maintain a joint mobile telecommunication account associated with the communications network and a joint cable-television account with the cable-television network, and the two networks share access to the joint accounts. A profile is maintained, for example, for each individual user in a joint or a group (e.g., family) account and updated by either of the two networks in accordance with ongoing relevant activities of an individual user associated with the profile.

For example, suppose the user and his wife have a young daughter who needs a mobile phone. The user may log into his online cable-television account using his desktop computer and register a new mobile phone that the user has bought for his daughter. The cable-television network would then process the user's online request to register the new mobile phone by creating a profile for the new mobile phone in the user's joint account. Alternatively, the user may register the new mobile phone for his daughter by initiating communication with the cable set-top box through a wireless device, such as the short-range wireless device 102. Upon receiving a request to register the new mobile phone, the set-top box would identify device information associated with the new mobile phone (e.g., device capacity such as video and text capacity, device type, device manufacturer, etc.) and pass the request along with the device information to the cable-television network. The cable-television network then creates a profile for the new mobile phone. Thereafter, the profile would be updated and shared by both the cable-television network and the communications network.

VI. AN EXEMPLARY SYSTEM FOR DIRECT COMMUNICATION BETWEEN END POINT DEVICES

Figure 5:
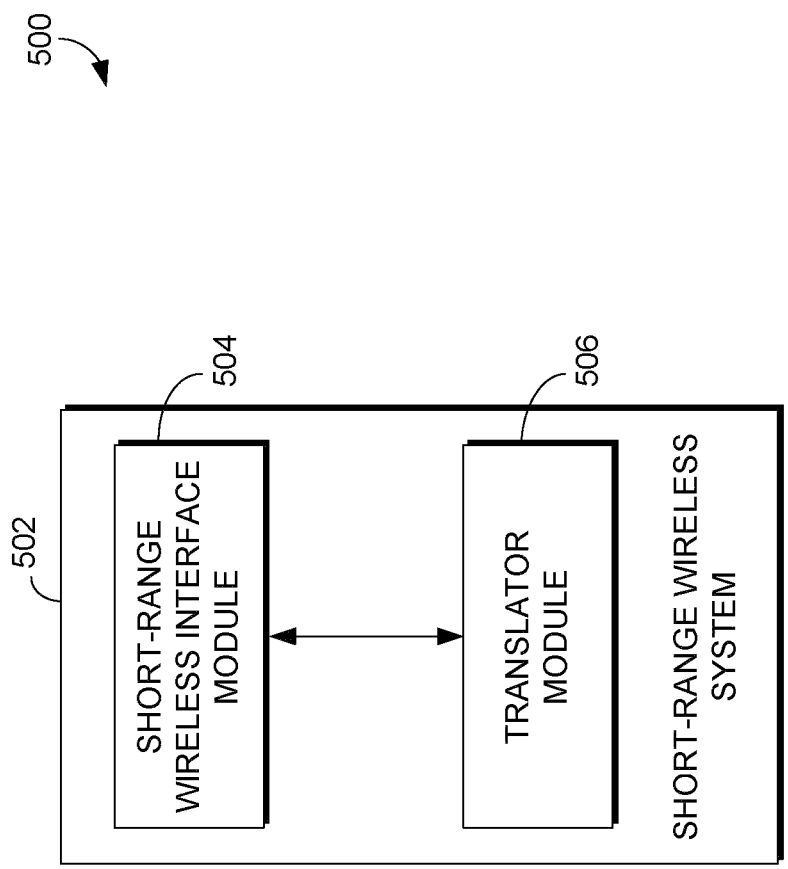
FIG. 5 depicts an exemplary system for enabling direct communication between a mobile device associated with a mobile telecommunications network and a media host device associated with a media-delivery network in accordance with an embodiment of the present invention.

FIG. 5 is a block diagram showing an exemplary system 500 for enabling direct communication between a mobile device associated with a mobile telecommunications network and a media host device associated with a media-delivery network. The short-range wireless system 502 includes a short-range wireless interface module 504 and a translator module 506. The short-range wireless interface module 504 is configured to interface end point devices (e.g., the media host device 104 and the mobile device 108) and the translator module 506 is configured to convert the format of messages passing through the short-range wireless system 502, which facilitates direct communications between end point devices associated with different networks typically employing different communications protocols.

Typically, the short-range wireless interface module 504 communicates with its host device (e.g., the media host device 104) using USB protocol. It also typically communicates with wireless devices (e.g., the mobile device 108) through a personal area network (PAN) (e.g., the wireless PAN 118) using a common protocol (e.g., the Bluetooth protocol). In some embodiments, the short-range wireless interface module 504 is configured to receive an initial request to communicate and any subsequent messages from one or more of the wireless devices. In such embodiments, typically it is also configured to authenticate each of the requesting wireless devices. In some embodiments, the short-range wireless interface module 504 is configured to detect the presence of the wireless devices when the wireless devices enter within range of the PAN. In such embodiments, it sends a request to communicate and communicates messages to one or more of the detected wireless devices.

The translator module 506, in general, communicates with the short-range wireless interface module 504 to receive and translate a message received at the short-range wireless interface module 504 from one end. The translator module 506 then returns the translated message to the short-range wireless interface module 504 for pushing the translated message out to the other end.

Typically, networks employing different protocols use different message formats. Also, each network may employ different encryption method to restrict access to messages routed within the network. For instance, it is likely that a wireless communication network (e.g., the mobile telecommunications network 110) and another network such as the media-delivery network 106 (e.g., a cable-television network) each employs a unique encryption method to limit access to the network to authorized devices that have been distributed to, or are owned by, paying subscribers. In some embodiments, the translator module 506 is equipped with at least one proprietary software component that can decode messages that have been encrypted by a particular network. In some embodiments, the translator module 506 runs a set of software subcomponents. In such embodiments, each of the software subcomponents is configured to convert or translate messages that are wrapped up in a particular protocol format or to decode messages encrypted by a particular algorithm.

Returning to the example about a user and his wife, when the user communicates his request to record a new episode of his favorite HBO miniseries by sending a message to the cable set-top box, the short-range wireless interface module 504 receives the message, determines that the message needs to be translated, and sends it to the translator module 506. The translator module 506 performs the necessary translation and returns the translated message to the short-range wireless interface module 504. The short-range wireless interface module 504 then communicates the translated message to the media host device 104. The media host device 104 then schedules a recording task in accordance with the user's request. The user watches the recorded episode later when his wife finishes watching the kitchenware demonstration.

VI. CONCLUSION

As can be seen, the present invention and its equivalents are well-adapted to provide a new and useful method for: (1) enabling direct communication between an end point device associated with a network and an end point device associated with a different network, and (2) allowing vendors to more accurately target advertising to specific customers and allowing customers the benefit of indicating their respective preferences.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-storage media having computer-executable instructions embodied thereon that, when executed by a processor, perform a method for enabling a media host device associated with a media-delivery network to communicate with a mobile end point associated with a wireless communications network through a base transceiver station, the method comprising:

receiving from the mobile end point at a short-range wireless device in communication with the media host device a message in a first format used by the mobile end point and the short-range wireless device requesting that media content of the media-delivery network be delivered to the mobile end point;

converting the message in the first format to a second format used by the media host device and the media-delivery network;

communicating the message in the second format from the media host device to the media-delivery network;

storing the message in a database shared between the wireless communications network and the media-delivery network, wherein both an authenticated entity on the wireless communications network and an authenticated entity on the media-delivery network are able to access the message from the database;

notifying the authenticated entity on the wireless communications network that the message is available and placing a media identifier of the media content in the database; and retrieving by the authenticated entity of the wireless communications network the media identifier and moving the media identifier to the mobile end point to permit retrieval of the media content at the mobile end point.

2. The one or more computer-storage media of claim 1, wherein the first format is an encryption specific to the wireless network and the second format is an encryption specific to the media-delivery network.

3. The one or more computer-storage media of claim 1, wherein the message includes one or more of account information update, a request to update account information, user information update, a request to update user information, a request to register a mobile end point, and a request to perform one or more task.

4. The one or more computer-storage media of claim 1, wherein the database includes subscribers account information shared by the media-delivery network and the wireless communications network.

5. One or more non-transitory computer-storage media having computer-executable instructions embodied thereon that, when executed by a processor, perform a method for enabling a first end point associated with a first network to communicate with a plurality of end points associated with a second network through a base transceiver station, the method comprising:

initiating by a short-range wireless device associated with the first end point communication with a second end point and a third end point, each associated with the second network, wherein the second and third end points are each associated with a different user profile having different user preferences;

communicating by the short-range wireless device a first media content message to the second end point and a second media content message to the third end point, to provide information about available media content of the first network according to the user profile of the second end point and the user profile of the third end point, respectively;

receiving from the second end point at the first end point short-range wireless device a message in a first format used by the first end point and the short-range wireless device;

translating the message at the short-range wireless device into a second format used by the first end point and the first network;

communicating the translated message from the first end point to the first network for processing thereof;

making the message available for the second network by storing the message on the first network in a database that is shared between the first network and the second network, wherein the database is associated with and accessible by an authenticated entity on the first network and an authenticated entity on the second network;

communicating a notification to the authenticated entity on the second network that the message is available for access by the authenticated entity on the second network and placing in the database a media identifier of the available media content of the first network according to the user profile; and retrieving by the authenticated entity on the second network the media identifier and moving the media identifier to the second end point to permit retrieval of the media content at the second end point.

6. The one or more computer-storage media of claim 5, wherein the short-range wireless device and the plurality of end points must be within a short-range distance.

7. The one or more computer-storage media of claim 6, wherein the short-range distance is on the order of ten feet.

8. The one or more computer-storage media of claim 5, wherein the short-range wireless device uses a software module to translate the message.

9. The one or more computer-storage media of claim 5, wherein the short-range wireless device is communicatively coupled to the first end point.

10. The one or more computer-storage media of claim 5, wherein the short-range wireless device is integrated within the first end point.

\* \* \* \* \*